INVENTORS
Laurence G. Horwitt
Donald J. Mattis
BY J. Patrick Cagney
ATTORNEY

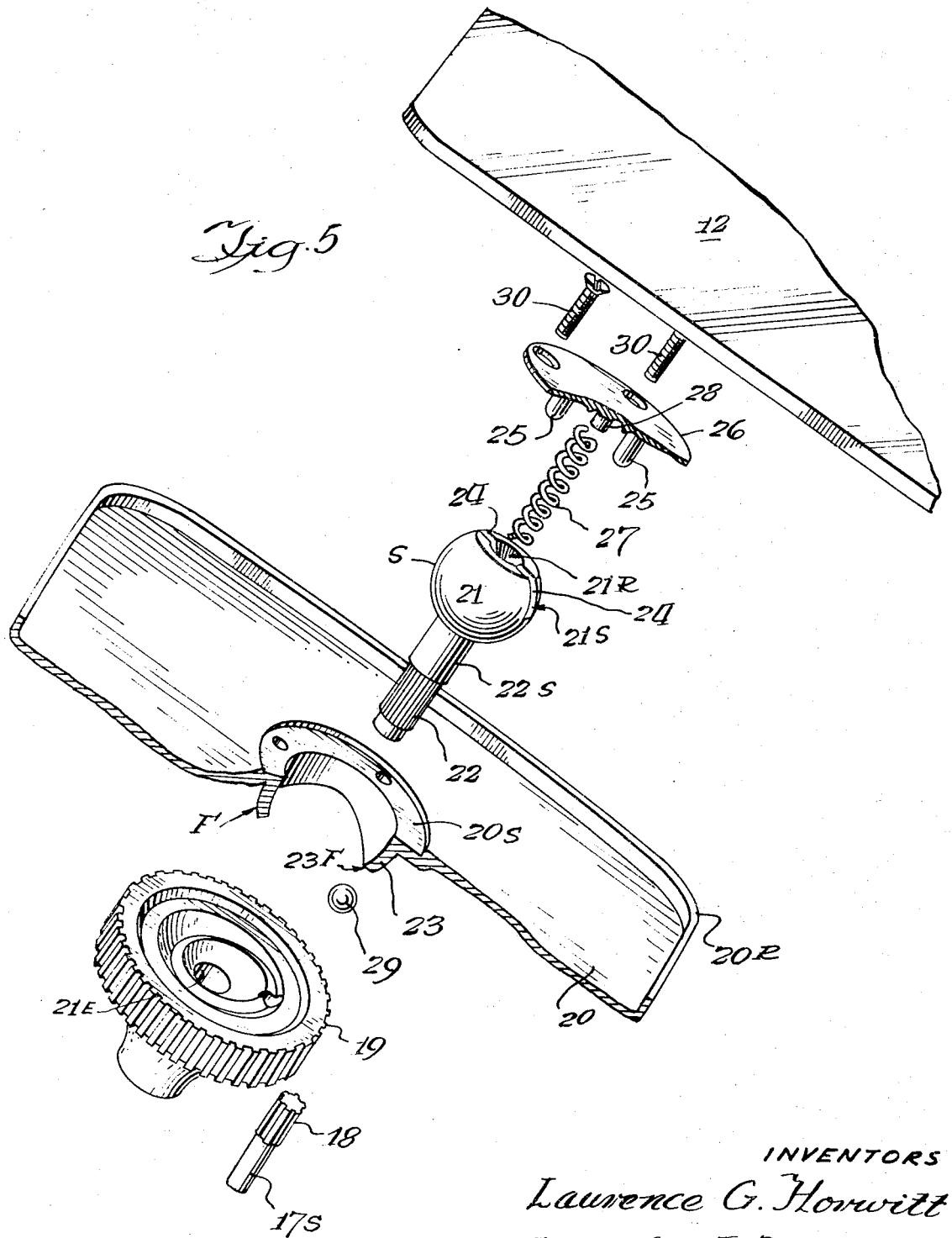

United States Patent Office 3,549,243
Patented Dec. 22, 1970

3,549,243
REMOTE CONTROL MIRROR
Laurence G. Horwitt, New Haven, and Donald J. Mattis, Norwalk, Conn., assignors to Casco Products Corporation, Bridgeport, Conn., a corporation of Connecticut
Filed Nov. 8, 1968, Ser. No. 774,353
Int. Cl. B60r 1/06
U.S. Cl. 350—289    6 Claims

ABSTRACT OF THE DISCLOSURE

A remotely adjustable outboard mirror assembly is disclosed wherein a ball and socket joint is equipped with interengaging abutments to constrain relative movement to swivel movement about each of a pair of normal axes. A mirror mount is carried with the floating socket and is actuated through a predetermined pattern of swivel movement about each of the axes by means of a ball cam that is carried within a rotary drive gear in one-way camming engagement with an elliptical cam track provided on the floating socket. A spring holds the ball and socket firmly seated and resiliently opposes the camming action to maintain the arrangement against wobble and play.

BACKGROUND OF THE INVENTION

Remotely adjustable outboard mirrors are generally well known and many different arrangements have heretofore been devised. Automotive manufacturers have extremely high standards because of safety and cost competition. Within this framework, there remains an important need for a remotely adjustable mirror of sturdy and low cost construction that is easily suited to the diverse requirements occasioned by the differences between the individual cars and the individual drivers.

In the past, the position controlling mechanisms have incorporated separate means for effecting adjustment of the mirror about different axes. This approach is shown in the following patents: Holt Pat. No. 3,140,341, Henderson Pat. No. 3,008,375, Barcus Pat. No. 3,027,807, Cleminshaw Pat. No. 3,035,160 and Malachowski Pat. No. 3,286,545. While a proper range of angular adjustability is made possible, the complexity of two separate control modes is a disadvantage that has limited the market for such devices. A double mode adjustment control of more simplified form is shown in Savage Pat. No. 3,390,588 but each control mode therein is completely independent of the other so that there is no automatically defined predetermined pattern of adjustment. A single mode adjustment control of substantially simpler form is shown in Meade et al. Pat. No. 3,005,385 but the coverage of the possible range of angular adjustment is too limited.

SUMMARY OF THE INVENTION

The present invention provides a remotely adjustable mirror wherein a single mode rotary drive control actuates a dual axis movement constraining mechanism to effect positioning of a mirror through a full range of required angles. A simplified and low cost construction that is highly durable and reliable is provided which incorporates these features of adjustability.

In accordance with this invention, a remotely adjustable outboard mirror arrangement is comprised of movement constraining means including cooperating supporting and floating bearing structures that define a fore-and-aft reference axis and a corresponding reference plane normal to such axis and that accommodate pivoting movement of the floating bearing structure about normal axes lying in such reference plane, a mount for the mirror carried by the floating bearing structure to support the mirror with its plane of reflection in predetermined position relative thereto and single mode rotary drive means in camming engagement with the floating bearing structure to shift the plane of reflection through a predetermined pattern of swivelling movement about each of the normal axes.

The rotary drive means of the preferred embodiment is in one-way camming engagement with the floating bearing and a spring reacts between the bearings to resiliently oppose the one-way camming engagement. The bearings are ball and socket elements which are normally held engaged by the spring and which are constrained by the action of interengaging abutments to accommodate dual axis relative pivoting movement. Thus, the spring enables a simplified one-way camming action by effecting an automatic return and it holds the bearings snugly in full surfaced engagement to eliminate wobble or play in the mechanism.

The ball is provided with a mounting recess for receiving one end of the spring in fixed relation and the socket receives an insert for fixed mounting of the other end of the spring.

The rotary drive means includes a drive gear journalled on the mounting shaft of the ball and having a bell-like shape to define a central pocket that receives the ball and socket in partly shrouded relation. Camming engagement is effected between a ball cam seated within the drive gear and a cam track bordering the convergent open end of the socket. The cam track is elliptically contoured to allow the ball cam to effect greater or lesser angular displacement of the plane of reflection of the mirror as it goes through its circular orbit.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification and in which like numerals are employed to designate like parts throughout the same:

FIG. 3 is a staggered transverse section through the mirror assembly taken approximately as indicated on the line 3—3 on FIG. 2 and showing the mirror at one extreme of its range of swivelling movement;

FIG. 4 is a staggered transverse section taken approximately as indicated by the line 3—3 on FIG. 2 and showing the mirror at an opposite extreme of its range of swivel movement; and FIG. 5 is an exploded view with parts broken away and sectioned to further illustrate the constructional details and assembly of the structure.

DESCRIPTION OF SPECIFIC EMBODIMENT

Figure 1:
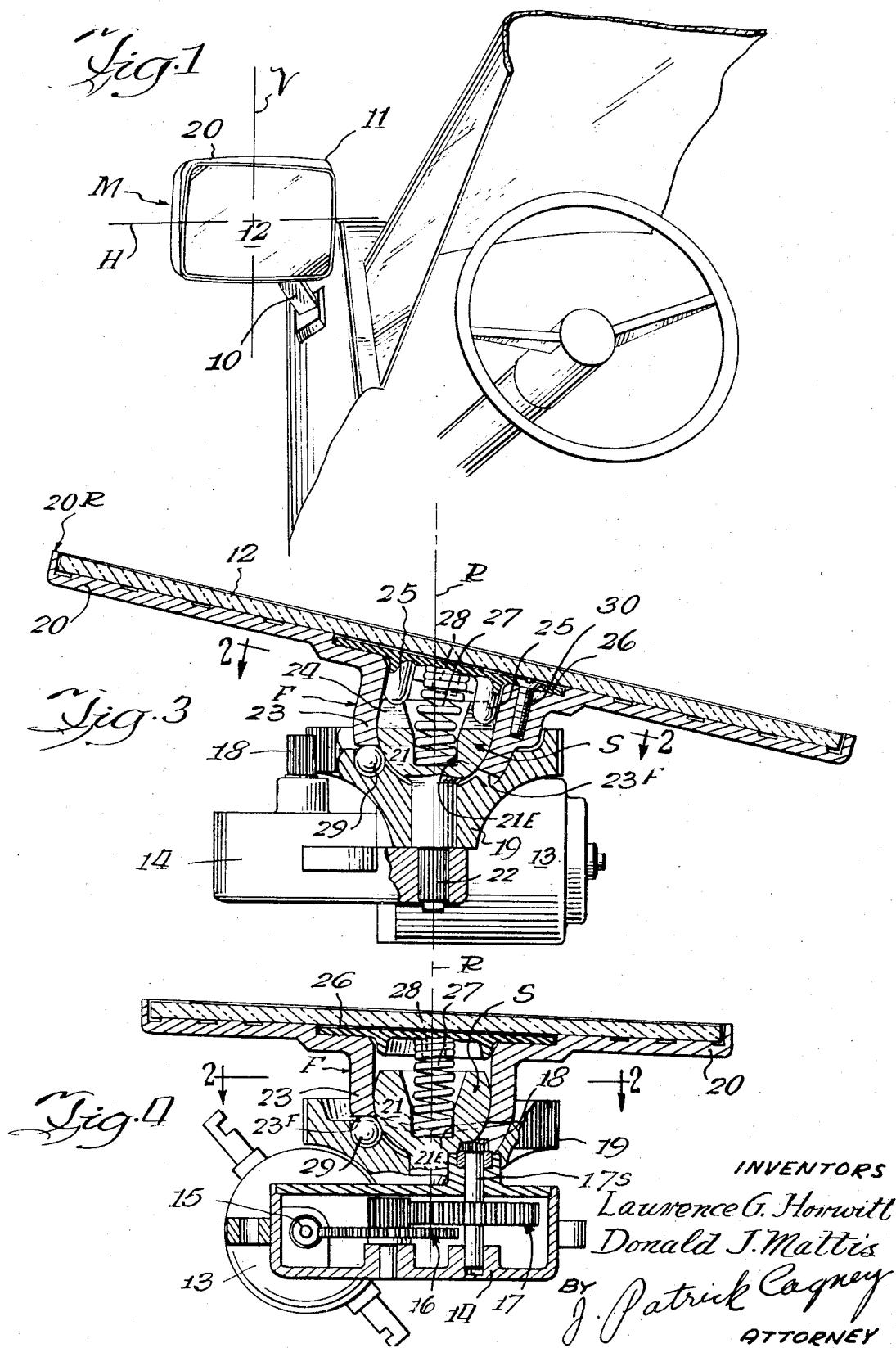
FIG. 1 is a fragmentary perspective view illustrating a remotely adjustable mirror mounted outboard upon an automobile.

Referring now to the drawings, and particularly to FIG. 1 thereof, a remotely adjustable rear view mirror assembly designated generally as M is shown positioned outboard on a conventional automobile A. In accordance with this invention, a single-mode rotary drive system is operated from a simple on-off control (not shown) within the automobile to effect adjustment of the reflecting plane of the mirror about dual axes, with sufficient angular range about each axis being provided to adapt the mirror to the individual needs arising from the differences in the automobiles and the differences in the drivers.

Figure 2:
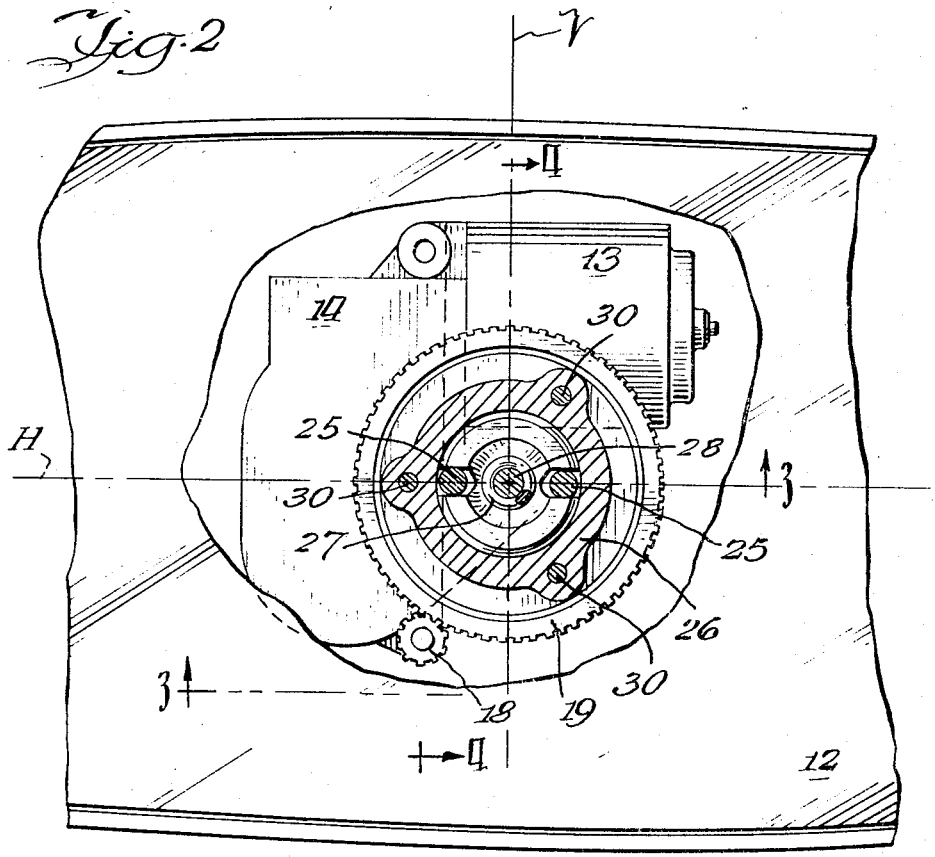
FIG. 2 is a front elevational view of the mirror with portions broken away to show certain internal arrangements of the parts.

The mirror assembly M as shown in FIG. 1 includes an attachment bracket 10 carrying a support housing 11 which contains the various drive and guide mechanisms. The housing 11 is hollowed and is open full width across its rearwardly directed face to accommodate the actual mirror element 12 in a generally flushly nested relation, with sufficient clearance to permit the mirror to be pivoted about horizontal and vertical transverse axes H and V, respectively, which are located approximately as indicated in FIGS. 1 and 2.

The single mode rotary drive mechanism mounted within the housing 11 includes an electric motor 13 and a gear box unit 14 are fixed within the support housing 11 with the motor having a worm type drive shaft 15 (FIG. 4) engaging a step-down pinion gear 16 which in turn drives a second step-down pinion gear 17, all of which are journalled in suitable bearings in the gear box. The gear box 14 includes an integral flange or boss 23F as is best seen in FIGS. 2 and 3 which serves as the primary support for the movement constraining mechanism that guides the mirror 12 through a predetermined path of swivelling movement comprised of rotation about each of the transverse axes H, V. It will be noted that the shaft 17S of the second pinion 17 projects outboard of the gear box 14 to carry a small gear 18 which is in mesh with a main drive gear 19 that actuates the movement constraining mechanism.

Figure 6:
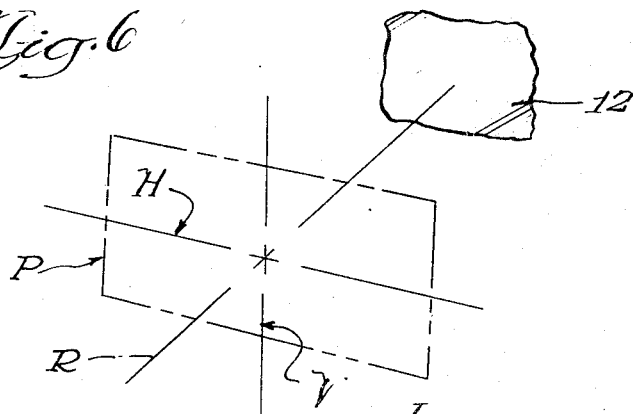

A dual axis movement constraining mechanism utilized in the preferred embodiment that is illustrated herein for purposes of disclosure includes cooperating supporting and floating bearing structures designated generally at S and F, respectively, which define a fore and aft reference axis R as shown in FIGS. 3 and 4. The transverse axes H and V constitute normal axes that lie in and define a reference plane P which is, in turn, normal to the reference axis, with the reference plane P being offset from the location of the mirror 12 in the disclosed embodiment, all as illustrated in the schematic diagram of FIG. 6.

The movement constraining mechanism incorporates a mount 20 for the mirror element 12 which is carried by the floating bearing structure F and which supports the mirror element with its plane of reflection in a predetermined position relative to the floating bearing structure and relative to the previously defined reference plane P. Thus the mirror element is constrained to be movable so that the plane of reflection pivots about each of the transverse axes H, V. In the position illustrated in FIG. 4, the plane of reflection is parallel to the reference plane to show that the predetermined pattern of swivelling movement for the illustrated embodiment includes such a positional relationship. The drive gear 19 serves as single-axis drive means operating in camming engagement with the floating bearing structure F in a fashion to shift the plane of reflection of the mirror through a predetermined pattern of swivelling movement which is constituted by swinging movement about each of the normal transverse axes H and V. At any given instant, the mirror 12 may be undergoing swinging movement about either one or both of these axes depending upon the cam profile.

A compact bearing arrangement is utilized in the preferred embodiment which is illustrated herein for purposes of disclosure and it includes a type of universal ball and socket joint which is provided with interengaging abutment surfaces to prevent movement about the fore and aft reference axis R and thus accommodate swivelling movement only about the normal axes H and V that lies in the reference plane. In particular, the stationary bearing structure S is comprised of a ball 21 carried at one end of a stud 22 that is fixedly mounted in the gear box flange H and F and the floating bearing F comprises an endwise open spherical socket 23 which, as shown, is formed integrally with the mirror mount 20 and is convergent toward its open end to be captively swivelled upon the ball 21 in the fashion of a universal joint.

As best shown in FIG. 5, the abutment surfaces for preventing any substantial movement of the mirror about the fore and aft reference axis R include flanking shoulder portions 24 provided on the ball to mate with flanking shoulder portions 25 provided on the socket. In the particular form illustrated herein, the ball 21 is truncated in form and has a central recess 21R opening endwise therethrough and opening laterally through flanking slots 21S to define the pairs of abutment shoulders. Correspondingly the floating bearing structure includes a fixed insert 26 functioning as a part of the mirror mount and including flanking stud portions to serve as the flanking shoulder portions 25 that nest in the lateral slots and cooperate therewith to constrain swivelling movement of the floating bearing structure to rotation about each of the normal axes H and V.

A spring 27 is shown reacting between the bearing structures normally to bias the floating bearing towards a position of coincidence with the reference plane, this being the position which is represented in FIG. 4. The spring 27 is shown as a helical coil element extending into the ball recess, with one end seated in a restricted end 21R of the recess to be in fixed relation to the ball and with the other end in telescoping gripping engagement over a center stud 28 on the insert 26 to be in fixed relation to the socket 23. Intermediate coils of the spring element are free to resiliently deform or twist as necessary for following relative swivelling movement between the ball and socket. The intermediate coils of the spring are compressed but in a naturally straight alignment in the position shown in FIG. 4 and are under a twisting stress in all other positions so as to resiliently act to return towards normal straight alignment. It may be understood, therefore, that the spring 27 resiliently opposes any camming forces tending to shift the mirror from the position shown in FIG. 4.

In the preferred embodimenta, a one-way camming arrangement is utilized wherein positive cam action displaces the floating bearing structure in directions away from coincidence with the reference plane P against the resilient opposing action of the spring 27. The drive gear 19 which constitutes the single opposing mode rotary drive means is journalled on an intermediate shaft portion 22S of the ball and stud element. The drive gear 19 is of a bell-like shape to define a central pocket that receives and partly shrouds the end faces of the ball and of the floating socket 23 of the bearing assembly. The pocket wall of the drive gear is provided with a circular seat for a ball bearing 29 which serves as the active cam element to engage a cam track defined on the end face 23F of the socket.

The cam ball 29 executes a circular orbit about the axis of the drive gear 19 while the cam track 23F has an elliptical form in that its locus projects as a circle on the reference plane but its locus is sloped along a direction axially forwardly of the reference plane. The degree of axial offset of the various regions of the cam track determines the instantaneous incline of the plane of reflection of the mirror.

It will be noted, in the particular embodiment illustrated herein, that the mirror 12 does not undergo rotation about the fore and aft reference axis R so that it only undergoes a swivel or wobble movement as the cam ball 29 travels its orbit.

In addition, the cam track has two symmetrical half portions so that the mirror undergoes two cycles of its predetermined swivel movement during the a single orbit of the cam ball 29.

In the particular embodiment illustrated herein, the mirror mount 20 and socket 23 are a one-piece structure, the mirror mount 20 including a peripheral rim 20R to allow flush reception of the mirror element 12, the mount also including a recessed annular seat 20S provided with tapped holes to accommodate subsequent countersunk mounting of the insert. As shown in FIG. 4, the ball and stud element 21, 22 is inserted through the socket portion 23 of the mount 20 so that the convergent end portion of the spherical socket 23 holds the ball captive therein. The spring 27 has one end seated in the recess 21R of the ball and has the other end applied to the stud 28 of the insert so that both ends of the spring are fixed against the corresponding bearing structures, with the spring being compressed and acting to hold the ball 21 firmly seated against the convergent end of the socket 23 so that undesired wobble and play are avoided. The screws 30 anchor the insert 26 in the annular seat 20S and the mirror is fixed in place in the mount in masking relation to the insert 26.

Thus, while referred construction features of the invention are embodied in the structure illustrated herein, it is to be understood that changes and variations may be made by those skilled in the art without departing from the spirit and scope of the appended claims.

The embodiments of the invention in which an exclusive privilege or property is claimed are defined as follows:

1. In a remotely adjustable outboard mirror arrangement, a stationary bearing member, a floating bearing member bearing against the stationary member for controlled swivel movement about a central pivot point, said floating bearing member carrying a mount for a mirror, stop means for preventing rotary movement of the floating bearing member about a fore and aft axis through said pivot point, spring means reacting between said members along the direction of the fore and aft axis to bias said members into swivel engagement and normally to bias said members toward predetermined alignment along said axis, cam means engageable with the floating bearing member and acting in opposing relation to the spring means for holding the floating bearing member at a swivel position offset from said predetermined alignment, and single mode rotary drive means drivingly engageable with said cam means to transport said cam means around said fore and aft axis in one-way camming engagement with said floating bearing member to move the floating bearing member through a predetermined swivel pattern that includes rotation about each of normal axes that lie in a plane that intersects said point and is normal to said fore and aft axis.

2. In a mirror arrangement in accordance with claim 1 and wherein said stationary bearing member comprises a ball and said floating bearing member comprises a spherical socket swivelled upon said ball.

3. In a mirror arrangement in accordance with claim 1 and wherein said stationary bearing member comprises a ball, said floating bearing member comprises a spherical socket swivelled upon said ball, constrained against rotation about said reference axis and presenting a cam track defining a path encircling said fore and aft axis in an axially varying relation and said rotary drive means being rotatable about said reference axis and having an orbiting cam element engageable with said track.

4. In a mirror arrangement in accordance with claim 1 and wherein said stationary bearing member comprises a ball having a recess opening endwise thereof and bounded by flanking shoulder portions and said floating bearing member comprises an endwise open spherical socket swivelled upon said ball and having flanking shoulder portions mating with the shoulder portions of said ball to define the stop means that constrain swivelling movement of said floating bearing member against rotation about said fore and aft axis and wherein said spring means is disposed between said ball and said socket normally to bias said floating bearing member towards coincidence with said reference plane.

5. In a mirror arrangement in accordance with claim 4 and wherein said spring means is a helical coil element disposed in said recess and having one end in fixed relation to said ball and the other end in fixed relation to said socket, with intermediate coils of said element being free to resiliently deform as necessary for following relative swivelling movement between said ball and socket.

6. In a mirror arrangement in accordance with claim 1 and wherein said stationary bearing member comprises a ball and stud element having an intermediate journal portion and having a ball portion provided with a recess opening endwise and opening through lateral slots and said floating bearing member comprises an endwise open spherical socket captively swivelled upon said ball portion and having flanking stud portions nesting in the lateral slots to define the stop means that constrain swivelling movement of said floating bearing member against rotation about said fore and aft axis and wherein said spring means is disposed between said ball portion and said socket normally to bias said floating bearing member towards coincidence with said reference plane.

References Cited
UNITED STATES PATENTS 3,024,049   3/1962   Tranas _____ 248—483X
3,459,470   8/1969   Hahn _____ 350—289

DAVID SCHONBERG, Primary Examiner

J. W. LEONARD, Assistant Examiner

U.S. Cl. X.R.

74—86; 248—483; 287—21